United States Patent [19]

Coleman, III et al.

[11] Patent Number: 4,577,001
[45] Date of Patent: * Mar. 18, 1986

[54] POLYMERIZATION OF OLEFINS EMPLOYING A CATALYST CONTAINING A TITANIUM COMPONENT DERIVED FROM HYDROXYALKYL AROMATIC COMPOUNDS

[75] Inventors: William M. Coleman, III, Lake Jackson; Morris S. Edmondson, Alvin, both of Tex.

[73] Assignee: The Dow Chemical Company, Midland, Mich.

[ * ] Notice: The portion of the term of this patent subsequent to Jun. 5, 2001 has been disclaimed.

[21] Appl. No.: 670,524

[22] Filed: Nov. 13, 1984

Related U.S. Application Data

[62] Division of Ser. No. 566,107, Dec. 27, 1983, Pat. No. 4,528,339.

[51] Int. Cl.$^4$ .......................... C08F 4/44; B01J 37/00
[52] U.S. Cl. .................................. 526/127; 526/136; 526/142; 526/144; 526/132; 526/150; 526/151; 526/153; 526/163; 502/125
[58] Field of Search ............... 526/142, 127, 132, 144, 526/150, 151, 153, 352, 163; 502/156

[56] References Cited

U.S. PATENT DOCUMENTS

| | | | |
|---|---|---|---|
| 2,965,626 | 12/1960 | Pilar et al. | 526/142 |
| 3,006,904 | 10/1961 | Jahrstorfer et al. | 526/142 |
| 3,793,295 | 2/1974 | Luciani et al. | 526/142 |
| 4,426,316 | 1/1984 | Gessell | 526/142 X |
| 4,451,626 | 5/1984 | Shipley et al. | 526/142 X |
| 4,452,914 | 6/1984 | Coleman, III et al. | 526/142 X |

*Primary Examiner*—Joseph L. Schofer
*Assistant Examiner*—Fred M. Teskin
*Attorney, Agent, or Firm*—James G. Carter

[57] ABSTRACT

Olefins are polymerized in the presence of catalysts prepared from titanium compounds prepared by reacting a titanium compound such as titanium tetraisopropoxide with a compound containing at least one aliphatic hydroxyl group.

24 Claims, No Drawings

POLYMERIZATION OF OLEFINS EMPLOYING A CATALYST CONTAINING A TITANIUM COMPONENT DERIVED FROM HYDROXYALKYL AROMATIC COMPOUNDS

This is divisional of application Ser. No. 566,107, filed Dec. 27, 1983, U.S. Pat. No. 4,528,339.

BACKGROUND OF THE INVENTION

This invention relates to precursors for and to new catalyst compositions useful for initiating and promotng polymerization of α-olefins and to a polymerization process employing such catalyst compositions.

It is well known that olefins such as ethylene, propylene and 1-butene in the presence of metallic catalysts, particularly the reaction products of organometallic compounds and transition metal compounds, can be polymerized to form substantially linear backbone polymers of relatively high molecular weight. Typically such polymerizations are carried out at relatively low temperatures and pressures.

Among the methods of producing such linear olefin polymers, some of the most widely utilized are those described by Professor Karl Ziegler in U.S. Pat. Nos. 3,113,115 and 3,257,332. In these methods, the catalyst employed is obtained by admixing a compound of a transition metal of Groups IVB, VB, VIB, and VIII of Mendeleev's Periodic Table of Elements with an organometallic compound. Generally, the halides, oxyhalides and alkoxides or esters of titanium, vanadium and zirconium are the most widely used transition metal compounds. Common examples of the organometallic compounds include the hydrides, alkyls and haloalkyls of aluminum, alkylaluminum halides, Grignard reagents, alkali metal aluminum hydrides, alkali metal borohydrides, alkali metal hydrides, alkaline earth metal hydrides and the like. Usually, polymerization is carried out in a reaction medium comprising an inert organic liquid, e.g. an aliphatic hydrocarbon, and the aforementioned catalyst. One or more olefins may be brought into contact with the reaction medium in any suitable manner. A molecular weight regulator, which is normally hydrogen, is usually present in the reaction vessel in order to suppress the formation of undesirable high molecular weight polymers.

Following polymerization, it is common to remove catalyst residues from the polymer by repeatedly treating the polymer with alcohol or other deactivating agent such as aqueous base. Such catalyst deactivation and/or removal procedures are expensive both in time and material consumed as well as the equipment required to carry out such treatment.

Furthermore, most of the aforementioned known catalyst systems are more efficient in preparing polyolefins in slurry (i.e., wherein the polymer is not dissolved in the carrier) than in solution (i.e., wherein the temperature is high enough to solubilize the polymer in the carrier). The lower efficiencies of such catalysts in solution polymerization is believed to be caused by the general tendency of such catalysts to become rapidly depleted or deactivated by significantly higher temperatures that are normally employed in solution processes. In addition, processes involving the copolymerization of ethylene with higher α-olefins exhibit catalyst efficiencies significantly lower than ethylene homopolymerization processes.

Recently, catalysts having higher efficiencies have been disclosed, e.g., U.S. Pat. Nos. 3,392,159; 3,737,393; West German Patent Application No. 2,231,982 and British Pat. Nos. 1,305,610 and 1,358,437. While the increased efficiencies achieved by using these recent catalysts are significant, even higher efficiencies are desirable, particularly in copolymerization processes.

Even more recently, e.g. British Pat. No. 1,492,379, high efficiency catalysts have been employed which permit polymerizaton temperatures above 140° C.. Such high polymerizaton temperatures provide for reduced energy requirements in solution polymerization processes in that the closer the polymerzation temperature is to the boiling point of the polymerization solvent, the less energy that is required in removing the solvent.

The present invention provides for catalysts having higher efficiencies at these temperatures or higher polymerization temperatures at comparable efficiencies.

SUMMARY OF THE INVENTION

One aspect of the present invention pertains to titanium complexes and/or compounds resulting from reacting (A) at least one titanium compound represented by the formula $Ti(OR)_xX_{4-x}$ wherein each R is independently a hydrocarbyl group having from 1 to about 20, preferably from about 1 to about 10, most preferably from about 2 to about 4 carbon atoms; X is a halogen and x has a value from zero to 4; with (B) at least one compound containing at least one aliphatic hydroxyl group represented by the formulas II and III;

wherein each A is independently a divalent hydrccarbyl group having from 1 to about 10, preferably fron 1 to about 4 carbon atoms; each R is independently hydrogen, a hydrocarbyl group or a halogen, nitro or hydrccarbyloxy substituted hydrocarbyl group, each such hydrocarbyl or hydrocarbyloxy groups having from 1 to about 20, preferably from 1 to about 10 carbon atoms; each R' is independently hydrogen, a halogen atom, a hydrocarbyl group, a hydrocarbyloxy group or a halogen, nitro or hydrocarbyloxy substituted hydrocarbyl group or a halogen, nitro or hydrocarbyloxy substituted hydrocarbyloxy group, each such hydrocarbyl or hydrocarbyloxy groups having from 1 to about 20, preferably from 1 to about 10 carbon atoms; each n is independently zero or 1; each n' has a value of from 1 to 5, preferably from 1 to 2, and each x independenty has a value of from zero to 4; and wherein components (A) and (B) are employed in quantities which provide a molar ratio of B:A of 0.1:1 to about 10:1, preferably from about 1:1 to about 5:1, most preferably from about 1:1 to about 2:1.

Another aspect of the present invention concerns an improvement in a Ziegler-Natta catalyst containing a titanium component and a metal alkyl component wherein the improvement comprises employing as the titanium component, that which results from reacting (A) at least one titanium compound represented by the formula $Ti(OR)_xX_{4-x}$ wherein each R is independently a hydrocarbyl group having from 1 to about 20, preferably from 1 to about 10, most preferally from about 2 to about 4 carbon atoms; X is a halogen and x has a value from zero to 4; with (B) at least one compound containing at least one aromatic hydroxyl group represented by the formulas I, II, III or IV;

wherein each A is independently a divalent hydrocarbyl group having from 1 to about 10, preferably from 1 to about 4, carbon atoms; each R is independently hydrogen, a hydrocarbyl group or a halogen, nitro or hydrocarbyloxy substituted hydrocarbyl group, each such hydrocarbyl or hydrocarbyloxy groups having from 1 to about 20, preferably from 1 to about 10 carbon atoms; each R' is independently hydrogen, a halogen atom, a hydrocarbyl group, a hydrocarbyloxy group or a halogen, nitro or hydrocarbyloxy substituted hydrocarbyl group or a halogen, nitro or hydrocarbyloxy substituted hydrocarbyloxy group, each such hydrocarbyl or hydrocarbyloxy groups having from 1 to about 20, preferably from 1 to about 10 carbon atoms; each n is independently zero or 1; each n' has a value of from 1 to 5, preferably from 1 to 2, and each x independently has a value of from zero to 4; and wherein components (A) and (B) are employed in quantities which provide a molar ratio of B:A of 0.1:1 to about 10:1, preferably from about 1:1 to about 5:1, most preferably from about 1:1 to about 2:1.

Also, another aspect of the present invention concerns a catalyst composition resulting from reacting in an inert hydrocarbon medium (A) at least one hydrocarbon soluble organomagnesium component represented by the formula MgR''$_2$.xMR''$_y$ wherein each R'' is independently a hydrocarbyl group having from 1 to 20 carbon atoms; M is a metal selected from Al, Zn, Si, Sn, B and P; y has a number corresponding to the valence of M and x has a value from about 0.001 to about 10;

(B) a halide source selected from (1) an active non-metallic halide, said non-metallic halide corresponding to the formula R'X wherein R' is hydrogen or a hydrocarbyl group having from 1 to about 20; preferably from 1 to about 10 carbon atoms and such that the hydrocarbyl halide is at least as active as sec-butyl chloride and does not poison the catalyst and X is halogen; or (2) a metallic halide corresponding to the formula MR$_{y-a}$X$_a$ wherein M is a metal of Group IIIA or IVA of Mendeleev's Periodic Table of Elements, R is a monovalent hydrocarbyl group having from 1 to about 20, preferably from 1 to about 10 carbon atoms, X is halogen, y is a number corresponding to the valence of M and a is a number from 1 to y;

(C) a compound or complex resulting from reacting (1) at least one titanium compound represented by the formula Ti(OR)$_x$X$_{4-x}$ wherein each R is independently a hydrocarbyl group having from 1 to about 20, preferably from 1 to about 10, most preferably from 2 to about 4, carbon atoms; X is a halogen and x has a value from zero to 4; with (2) at least one compound containing at least one aliphatic hydroxyl group represented by the formulas I, II, III or IV

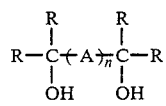

I.

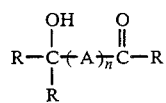

II.

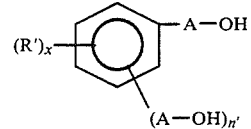

III.

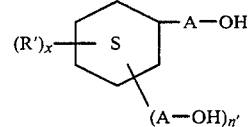

IV.

wherein each A is independently a divalent hydrocarbyl group having from 1 to about 10, preferably from 1 to about 4, carbon atoms; each R is independently hydrogen, a hydrocarbyl group or a halogen, nitro or hydrocarbyloxy substituted hydrocarbyl group, each such hydrocarbyl or hydrocarbyloxy groups having from 1 to about 20, preferably from 1 to about 10 carbon atoms; each R' is independently hydrogen, a halogen atom, a hydrocarbyl group, a hydrocarbyloxy group or a halogen, nitro or hydrocarbyloxy substituted hydrocarbyl group or a halogen, nitro or hydrocarbyloxy substituted hydrocarbyloxy group, each such hydrocarbyl or hydrocarbyloxy groups having from 1 to about 20, preferably from 1 to about 10 carbon atoms; each n is independently zero or 1; each n' has a value of from 1 to 5, preferably from 1 to 2, and each x independently has a value of from zero to 4; and wherein components (A) and (B) are exployed in quantities which provide a molar ratio of B:A of 0.1:1 to about 10:1, preferably from about 1:1 to about 5:1, most preferably from about 1:1 to about 2:1;

and when components (A) and/or (B) do not contain or contain an insufficient quantity of aluminum, then (D) an aluminum compound represented by the formula AlR$_{y'}$X$_{y''}$ wherein R is a hydrocarbyl group having from 1 to about 10, preferably from 1 to about 4, carbon atoms; X is halogen and y' and y'' each have a value of from zero to three with the sum of y' and y'' being three is employed;

and wherein the components are employed in quantities so as to provide the following ratios:

(1) a Mg:Ti atomic ratio of from about 1:1 to about 200:1, preferably from about 2:1 to about 100:1, most preferably from about 5:1 to about 50:1;

(2) components (C-2) and (C-1) are employed in quantities which provide a molar ratio of (C-2):(C-1) of from about 0.1:1 to about 10:1, preferably from about 1:1 to about 4:1, most preferably from about 1:1 to about 2:1;

(3) excess X:Al ratio of from about 0.0005:1 to about 10:1, preferably from about 0.002:1 to about 2:1, most preferably from about 0.01:1 to about 1.4:1; and (4) an Al:Ti atomic ratio of from about 0.1:1 to about 2000:1, preferably from about 0.5:1 to about 200:1, most preferably from about 1:1 to about 75:1.

The excess X is the quantity of halide above that which would be theoretically required to convert the magnesium compound to the dihalide.

Still another aspect of the present invention pertains to bidentate ligand-containing titanium compounds or complexes represented by the formulas

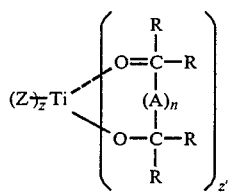

wherein A and R are as previously defined; each Z is independently a halogen or an R²O-group wherein each $R^2$ is independently a hydrocarbyl group having from 1 to about 20, preferably from 1 to about 10, most preferably from 2 to about 4, carbon atoms; z' has a value of 1 or 2; z has value of 3 when z' has a value of 1 and z has a value of 2 when z' has a value of 2;

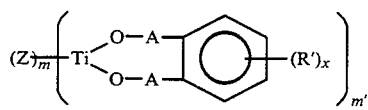

wherein A, R', Z, and x are as previously defined; m' has a value of 1 or 2; m has a value of 2 when m' has a value of 1 and m has a value of zero when m' has a value of 2.

Another aspect of the present invention is a process for the polymerizaton of α-olefins in the presence of the aforementioned catalysts.

As employed herein, the terms hydrocarbyl and hydrocarbyloxy include, for example, alkyl, cycloalkyl, aryl, aralkyl, alkenyl, alkoxy, cycloalkoxyl, aryloxy, aralkyloxy, alkenyloxy and the like.

DESCRIPTION OF THE PREFERRED EMBODIMENTS

Suitable compounds containing at least one aliphatic hydroxyl group which can be employed herein includes, for example, 1,2-dihydroxyoctane, d,1-benzoin, 1,2-benzenedimethanol, cis-1,2-cyclohexanedimethanol, 1,2-butanediol, 1,3-dihydroxypropane, mixtures thereof and the like.

Particularly suitable titanium compounds which can be employed herein include for example, tetraethoxy titanium, tetraisopropoxy titanium, tetra-n-butoxy titanium, tetraphenoxy titanium, tetra-n-propoxy titanium, tetra-(2-ethylhexoxy) titanium, di-n-butoxy titanium dichloride, titanium tetrachloride, mixtures thereof and the like.

Particularly suitable organomagnesium compounds include, for example, hydrocarbon soluble dihydrocarbyl-magnesium such as the magnesium dialkyls and the magnesium diaryls. Exemplary suitable magnesium dialkyls include particularly n-butyl-sec-butyl magnesium, diisopropyl magnesium, di-n-hexyl magnesium, isopropyl-n-butyl magnesium, ethyl-n-hexyl magnesium, ethyl-n-butyl magnesium, di-n-octyl magnesium and others wherein the alkyl has from 1 to 20 carbon atoms. Exemplary suitable magnesium diaryls include diphenylmagnesium, dibenzylmagnesium, and ditolylmagnesium. Suitable organomagnesium compounds include alkyl and aryl magnesium alkoxides and aryloxides and aryl and alkyl magnesium halides with the halogen-free organomagnesium compounds being more desirable.

Among the halide sources which can be employed herein are the active non-metallic halides and metallic halides.

Suitable non-metallic halides are represented by the formula R'X wherein R' is hydrogen or an active monovalent organic radical and X is a halogen. Particularly suitable non-metallic halides include, for example, hydrogen halides and active organic halides such as t-alkyl halides, allyl halides, benzyl halides and other active hydrocarbyl halides wherein hydrocarbyl is as defined hereinbefore. By an active organic halide is meant a hydrocarbyl halide that contains a labile halogen at least as active, i.e., as easily lost to another compound, as the halogen of sec-butyl chloride, preferably as active as t-butyl chloride. In addition to the organic monohalides, it is understood that organic dihalides, trihalides and other polyhalides that are active as defined hereinbefore are also suitably employed. Examples of preferred active non-metallic halides include hydrogen chloride, hydrogen bromide, t-butyl chloride, t-amyl bromide, allyl chloride, benzyl chloride, crotyl chloride, methylvinyl carbinyl chloride, α-phenylethyl bromide, diphenyl methyl chloride and the like. Most preferred are hydrogen chloride, t-butyl chloride, allyl chloride and benzyl chloride.

Suitable metallic halides which can be employed herein include those represented by the formula $MR_{y-a}X_a$ wherein M is a metal of Groups IIB, IIIA or IVA, of Mendeleev's Periodic Table of Elements, R is a monovalent organic radical, X is a halogen, Y has a value corresponding to the valence of M and a has a value from 1 to y. Preferred metallic halides are aluminum halides of the formula $AlR_{3-a}X_a$ wherein each R is independently hydrocarbyl as hereinbefore defined such as alkyl, X is a halogen and a is a number from 1 to 3. Most preferred are alkylaluminum halides such as ethylaluminum sesquichloride, diethylaluminum chloride, ethylaluminum dichloride, and diethylaluminum bromide, with ethylaluminum dichloride being especially preferred. Alternatively, a metal halide such as aluminum trichloride or a combination of aluminum trichloride with an alkyl aluminum halide or a trialkyl aluminum compound may be suitable employed.

It is understood that the organic moieties of the aforementioned organomagnesium, e.g., R", and the organic moieties of the halide source, e.g., R and R', are suitably any other organic radical provided that they do not contain functional groups that poison conventional Ziegler catalysts.

The magnesium halide can be preformed from the organomagnesium compound and the halide source or it can be formed insitu in which instance the catalyst is preferably prepared by mixing in a suitable solvent or reaction medium (1) the organomagnesium component and (2) the halide source, followed by the other catalyst components.

The compound or complex formed from reacting said titanium component and said component having at least one aliphatic hydroxyl group per molecule can be utilized as formed or the product can be isolated and then utilized at the appropriate place in the catalyst preparation.

When it is desired to prepare complexes employing molar ratios of titanium compound to hydroxyl-containing compound of about 1 to 1, it is preferred to add the hydroxyl-containing compound to the titanium compound.

When it is desired to prepare complexes employing molar ratios of titanium compound to hydroxylcontaining compound of about 1 to 2, it is preferred to add the titanium compound to the hydroxyl-containing compound.

Regardless of the molar ratios employed, when it is desired to prepare a complex containing mixed ligands by employing different hydroxyl-containing compounds, it is preferred to add the hydroxyl-containing compounds to the titanium compound wherein the rost acidic hydroxyl-containing compound is added first.

When the titanium compound and aliphatic hydroxyl-containing compounds are prereacted, temperatures from about 0° C. to about 200° C., preferably from about 20° C. to about 100° C., can be employed.

The foregoing catalyst components are combined in proportions sufficient to provide atomic ratios as previously mentioned.

In cases wherein neither the organomagnesium component nor the halide source contains aluminum or contains an insufficient quantity of aluminum, it is necessary to include in the total catalyst an aluminum compound such as an alkyl aluminum compound, e.g., a trialkyl aluminum, an alkyl aluminum halide or an aluminum halide. If polymerization temperatures below 180° C. are employed, the atomic ratios of Al:Ti may be from about 0.1:1 to about 2000:1, preferably from 1:1 to about 200:1. However, when polymerization temperatures above 180° C. are employed, the aluminum compound is used in proportions such that the Al:Ti ratio is less than 120:1, preferably less than 50:1. It is understood, however, that the use of very low amounts of aluminum necessitates the use of high purity solvents or diluents in the polymerization zone. Further, other components present in the zone should be essentially free of impurities which react with aluminum alkyls. Otherwise, additional quantities of an organometallic compound as previously described, preferably an organoaluminum compound, must be used to react with such impurities. Moreover, it is understood that in the catalyst the aluminum compound should be in the form of trialkyl aluminum or alkyl aluminum halide provided that the alkyl aluminum halide be substantially free of alkyl aluminum dihalide. In the above mentioned aluminum compounds, the alkyl groups independently have from 1 to about 20, preferably from 1 to about 10 carbon atoms.

When additional quantities of aluminum compound are employed, it can be added to the aforementioned catalyst during the preparation thereof or the aluminum deficient catalyst can be mixed with the appropriate aluminum compound prior to entry into the polymerization reactor or, alternatively, the aluminum deficient catalyst and the aluminum compound can be added to the polymerization reactor as separate streams or additions.

The foregoing catalytic reaction is preferably carried out in the presence of an inert diluent. The concentrations of catalyst components are preferably such that when the essential components of the catalytic reaction product are combined, the resultant slurry is from about 0.005 to about 1.0 molar (moles/liter) with respect to magnesium. By way of an example of suitable inert organic diluents can be mentioned liquified ethane, propane, isobutane, n-butane, n-hexane, the various isomeric hexanes, isooctane, paraffinic mixtures of alkanes having from 8 to 12 carbon atoms, cyclohexane, methylcyclopentane, dimethylcyclohexane, dodecane, industrial solvents composed of saturated or aromatic hydrocarbons such as kerosene, naphthas, etc., especially when free of any olefin compounds and other impurities, and especially those having boiling points in the range from about $-50°$ to about 200° C.. Also included as suitable inert diluents are benzene, toluene, ethylbenzene, cumene, decalin and the like.

Mixing of the catalyst components to provide the desired catalytic reaction product is advantageously carried out under an inert atmosphere such as nitrogen, argon or other inert gas at temperatures in the range from about $-100°$ to about 200° C., preferably from about 0° to about 100° C.. The period of mixing is not considered to be critical as it is found that a sufficient catalyst composition most often occurs within about 1 minute or less. In the preparation of the catalytic reaction product, it is not necessary to separate hydrocarbon soluble components from hydrocarbon insoluble components of the reaction product.

While the catalysts can be prepared by adding the components in essentially any order, it is preferred to add the components in one of the following orders:

(1) A, B, ((C-1) and (C-2), prereacted), D (if required)

(2) A, B, D (if required), ((C-1) and (C-2), prereacted)

(3) (A and B, prereacted), ((C-1) and (C-2), prereacted), D (if required)

(4) (A and B, prereacted), D (if required), ((C-1) and (C-2), prereacted)

(5) (A, B and D, if required, prereacted), ((C-1) and (C-2), prereacted)

In the polymerization process employing the aforementioned catalytic reaction product, polymerization is effected by adding a catalytic amount of the above catalyst composition to a polymerization zone containing α-olefin monomer, or vice versa. Any polymerization method can be employed including slurry, solution, gas phase, high pressure process, and the like. The polymerization zone is usually maintained at temperatures in the range from about 0° to about 300° C., preferably at solution polymerization temperatures, e.g., from about 130° to about 250° C., for a residence time of about a few seconds to several days, preferably 15 seconds to 2 hours (7200 s). It is generally desirable to carry out the polymerization in the absence of moisture and oxygen and a catalytic amount of the catalytic reaction product is generally within the range from about 0.0001 to about 0.1 millimoles titanium per liter of diluent. It is understood, however, that the most advantageous catalyst concentration will depend upon polymerization conditions such as temperature, pressure, solvent and presence of catalyst poisons and that the foregoing range is given to obtain maximum catalyst yields in weight of polymer per unit weight of titanium. Generally, in the polymerization process, a carrier which may be an inert organic diluent or solvent or excess monomer is employed. In order to realize the full benefit of the high efficiency catalyst of the present invention, care must be taken to avoid oversaturation of the solvent with polymer. If such saturation occurs before the catalyst becomes depleted, the full efficiency of the catalyst is not realized. For best results, it is preferred that the amount of polymer in the carrier not exceed about 50 weight percent based on the total weight of the reaction mixture.

It is understood that inert diluents employed in the polymerization recipe are suitable as defined hereinbefore.

The polymerization pressures preferably employed are relatively low, e.g., from about 5 to about 10,000 psig (0.034–68.9 MPa), preferably from about 50 to about 1000 psig, (0.345–6.89 MPa), most preferably from about 100 to about 700 psig (0.689–4.8 MPa). However, polymerization within the scope of the present invention can occur at pressures from atmospheric up to pressures determined by the capabilities of the polymerization equipment, which can include pressures up to about 50,000 psig (344.5 MPa). During polymerization it is desirable to stir the polymerization recipe to obtain better temperature control and to maintain uniform polymerization mixtures throughout the polymerization zone.

In order to optimize catalyst yields in the polymerization of ethylene under solution conditions, it is preferable to maintain an ethylene concentration in the solvent in the range of from about 1 to about 10 weight percent, most advantageously from about 1.2 to about 2 weight percent. To achieve this, when an excess of ethylene is fed into the system, a portion of the ethylene can be vented. In other processes, it is preferred to conduct the polymerization in an excess of the α-olefin being polymerized in order to optimize catalyst yields.

Hydrogen can be employed in the practice of this invention to control the molecular weight of the resultant polymer. For the purpose of this invention, it is beneficial to employ hydrogen in concentration ranging from about 0.001 to about 1 mole per mole of monomer. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst.

The monomer or mixture of monomers is contacted with the catalytic reaction product in any conventional manner, preferably by bringing the catalytic reaction product and monomer together with intimate agitation provided by suitable stirring or other means. Agitation can be continued during polymerization, or in some instances, the polymerization can be allowed to remain unstirred while the polymerization takes place. In the case of more rapid reactions with more active catalysts, means can be provided for refluxing monomer and solvent, if any of the latter is present, in order to remove the heat of reaction. In any event, adequate means should be provided for dissipating the exothermic heat of polymerization. If desired, the monomer can be brought in the vapor phase into contact with the catalytic reaction product, in the presence or absence of liquid material. The polymerization can be effected in the batch manner, or in a continuous manner, such as, for example, by passing the reaction mixture through an elongated reaction tube which is contacted externally with suitable cooling media to maintain the desired reaction temperature, or by passing the reaction mixture through an equilibrium overflow reactor or a series of the same.

The polymer is readily recovered from the polymerization mixture by driving off unreacted monomer and solvent if any is employed. No further removal of impurities is required. Thus, a significant advantage of the present invention is the elimination of the catalyst residue removal steps. In some instances, however, it may be desirable to add a small amount of a catalyst deactivating reagent of the types conventionally employed for deactivating Ziegler catalysts. The resultant polymer is found to contain insignificant amounts of catalyst residue and to possess a relatively narrow molecular weight distribution.

The following examples are given to illustrate the invention, and should not be construed as limiting its scope. All percentages are by weight and all parts are by molar or atomic ratio unless otherwise indicated.

In the following examples, the melt index values $I_2$ and $I_{10}$ were determined by ASTM D 1238-70 and the density values were determined by ASTM D 1248.

EXAMPLES

The position of ring substituents employed herein are in accordance with the Definitive Rules For Nomenclature of Organic Chemistry as provided in the *Handbook of Chemistry and Physics*, 50th Ed., Chemical Rubber Co., page C-1 et seq.

Preparation of Complexes

The new titanium complexes were prepared by mixing stock solutions (0.015 molar) of the titanium source, titanium tetrachloride ($TiCl_4$) or titanium tetraisopropoxide (tipt), and the aliphatic hydroxyl ligand in the desired ratio at the indicated temperature. The ratio (L/M) of moles ligand (L) to moles of titanium in the titanium source (M) utilized to prepare the desired complexes employed in the following examples is shown under the column heading L/M. However, in those instances where the titanium source was tipt and the L/M ratio was 2/1, then these complexes were prepared, isolated and then redissolved in Isopar ® in E. The various stock solutions were prepared at ambient temperatures by diluting the titanium source and/or ligand with Isopar ® E (an isoparaffinic hydrocarbon fraction having a boiling range of 116°–134° C.) to the desired volume to produce 0.015 molar solutions. These stock solutions were stored under a nitrogen atmosphere to prevent decomposition.

Complexes were prepared by mixing at ambient conditions (~25° C.) 1.0 or 2.0 cc of the 0.015 m stock titanium source with the required amount of stock ligand (0.015 m) solution to give the desired molar ligand to metal ratio (L/M). The mixture, usually colored, was allowed to sit for at least 5 minutes after which time it was added to the catalyst make up in place of the normal titanium source.

Preparation of Catalyst Compositions

Method A-1

The catalyst compositions were prepared by adding with stirring under a nitrogen atmosphere to a 4-ounce (118.3 cc) serum bottle the following components in the indicated order.

| | |
|---|---|
| 42 − x cc | of Isopar ® E |
| 4.0 cc | of 0.15 m di-butyl magnesium* (DBM) |
| 4.0 cc | of 0.15 m ethyl aluminum dichloride (EADC) |
| x cc | of titanium source or novel complex |
| 50.0 cc | total |

*Dibutylmagnesium is a commercial product of the Lithium Corporation of America. Its composition is indicated to be predominately n-butyl-s-butyl magnesium. Other commercially available magnesium alkyls that can be utilized are manufactured by Texas Alkyls and marketed under the tradename Magala and, Schering AG and marketed under the tradename Bomag.

All final catalyst solutions were 0.0003 molar in titanium and the volume of catalyst normally injected for a polymerization run was 10 cc (0.003 mmoles Ti). The atomic ratio of Mg/Al/Cl/Ti for these catalysts are shown in the appropriate tables.

Method A-2

The catalyst compositions were prepared by the procedure of Method A-1 from the following components added in the order indicated.

```
     46 − x cc  of Isopar ® E
        2.0 cc  of 0.15 m DBM
        2.0 cc  of 0.15 m EADC
        x cc    of titanium source or novel complex
       50.0 cc  total
```

All final catalyst solutions were 0.0003 molar in titanium and the volume of catalyst normally injected for a polymerization run was 10 cc (0.003 mmoles Ti). The atomic ratio of Mg/Al/Cl/Ti for these catalyst are shown in the appropriate tables.

Method A-3

The catalyst compositions were prepared by the procedure of Method A-1 from the following components added in the order indicated.

```
   50 − (2A + x) cc  of Isopar ® E
           A cc     of 0.15 m DBM
           A cc     of 0.15 m EADC
           x cc     0.015 m Ti source or novel complex
          50.0 cc   total
```

Method B

1. Preparation of Anhydrous $MgCl_2$

To 21.16 ml of 0.709 molar dibutyl magnesium was added 78.84 ml of Isopar ® E. Anhydrous electronic grade HCl was passed through the solution until all of the magnesium alkyl had been converted to magnesium chloride. Excess HCl was stripped from the slurry by purging with dry $N_2$. The resulting slurry (0.15 molar) of $MgCl_2$ in Isopar ® E was stored under a nitrogen atmosphere and utilized as a stock solution in the preparation of catalyst compositions.

2. Catalyst Compositions

The catalyst compositions were prepared by adding with stirring under a nitrogen atmosphere to a 4-ounce (118.3 cc) serum bottle the following components in the indicated order.

```
     38 − x cc  of Isopar ® E
        8.0 cc  of 0.15 m MgCl2 (as prepared above)
        2.0 cc  of 0.15 m diethyl aluminum chloride (DEAC)
                  as excess halide source
        x cc    of titanium source or novel complex
        2.0 cc  of 0.15 m triethyl aluminum (TEA)
       50.0 cc  total
```

All final catalyst solutions were 0.0003 molar in titanium and the volume of catalyst normally injected for a polymerization run was 10 cc (0.003 millimoles Ti). The atomic ratios of Mg/Al/Cl/Ti for these catalysts were 40/20/90/1 if tetraisopropoxytitanium was employed as the Ti precursor and 40/20/94/1 if tetrachlorotitanium was employed as the Ti precursor.

3. Catalyst Compositions

The catalyst compositions were prepared by adding with stirring under a nitrogen atmosphere to a 4-ounce (118.3 cc) serum bottle the following components in the indicated order.

```
   45 − (x + y) cc  of Isopar ® E
           4.0 cc   of 0.15 MgCl2
           x cc     of 0.15 DEAC
           1.0 cc   of titanium source or novel complex
           y cc     of 0.15 m TEA
          50.0 cc   total
```

All final catalyst solutions were 0.0003 molar in titanium and the volume of catalyst normally injected for a polymerization run was 10 cc (0.003 millimoles). The final atomic ratios of Mg/Al/Cl/Ti are shown in the appropriate Tables.

4. Catalyst Composition

The catalyst composition was prepared by adding with stirring under a nitrogen atmosphere to a 4-ounce (118.3 cc) serum bottle the following components in the indicated order.

```
       43.0 cc  of Isopar ® E
        4.0 cc  of 0.15 MgCl2
        0.5 cc  of 0.15 EADC
        1.0 cc  tetraisopropyltitanium
        1.5 cc  of 0.15 m TEA
       50.0 cc  total
```

The final catalyst solution was 0.0003 molar in titanium and the volume of catalyst normally injected for a polymerization run was 10 cc (0.003 mmoles Ti). The atomic ratio of Mg/Al/Cl/Ti for this catalyst is shown in the appropriate tables.

POLYMERIZATION CONDITIONS

General Procedure

A stirred, 1 gallon (3.79 l) batch reactor containing 2 liters of Isopar ® E was heated to the desired temperature and the solvent vapor pressure recorded. To this was added 5-6 psig (35-41 kPa) of hydrogen and the ethylene was added to give the desired final reactor pressure. An amount of the above catalyst was injected into the reactor and the reactor pressure was maintained constant at the desired final pressure by continually feeding ethylene during the polymerization run. The total reaction time was 20 minutes (1200 s). The novel titanium species, the L/M ratio utilized in its preparation and the resulting catalyst efficiencies are given in the following tables. All catalyst efficiencies are given as grams of polyethylene produced per gram of titanium employed in the 20 minutes (1200 s) polymerization run. The initial temperature was set at 195° C., the vapor pressure of the solvent was 60 psig (414 kPa) and 5 psig (35 kPa) of hydrogen was added followed by 385 psig (2655 kPa) of ethylene yielding a final total pressure of 450 psig (3103 kPa).

Table I provides the results obtained when a hydroxyl-containing compound represented by formula IX is employed as the ligand and $TiCl_4$ was used as the Ti precursor.

The following formulas are referenced in the Tables.

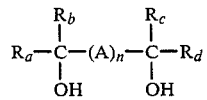

IX.

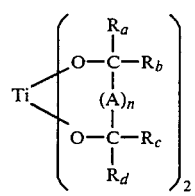

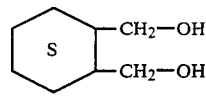

X.

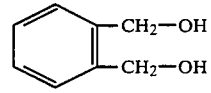  XIII.

XI.

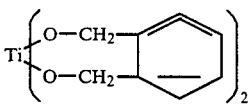  XIV.

XII.

$$R_a-\underset{R_b}{\overset{OH}{C}}-(A)_n-\overset{O}{C}-R_c$$  XV.

TABLE I

| Example[1] or Comparative Experiment[2] | Ti Compound | Catalyst Preparation Method | Ligand Source | L/M | Ti Eff. × $10^{-6}$ | Exotherm °C. | Mg/Al/Cl/Ti |
|---|---|---|---|---|---|---|---|
| 1 | TiCl$_4$ | A-1 | Formula IX wherein $R_a = R_d = CH_3$; $R_b = R_c = H$ and n = 0 | 1/1 | 0.977 | 20 | 40/40/84/1 |
| 2 | TiCl$_4$ | A-2 | Formula IX wherein $R_a = R_d = CH_3$; $R_b = R_c = H$ and n = 0 | 1/1 | 0.850 | 17 | 20/20/44/1 |
| 3 | TiCl$_4$ | A-1 | Formula IX wherein $R_a = R_d = CH_3$; $R_b = R_c = H$; n = 2; and A = —CH$_2$— | 1/1 | 0.977 | 17 | 40/40/84/1 |
| 4 | TiCl$_4$ | A-2 | Formula IX wherein $R_a = R_d = CH_3$; $R_b = R_c = H$; n = 2; and A = —CH$_2$— | 1/1 | 0.838 | 16 | 20/20/44/1 |
| 5 | TiCl$_4$ | A-1 | Formula IX wherein $R_a = R_b = R_c = H$; $R_d = C_6H_{13}$ and n = 0 | 1/1 | 0.849 | 16 | 40/40/84/1 |
| 6 | TiCl$_4$ | A-2 | Formula IX wherein $R_a = R_b = R_c = H$; $R_d = C_6H_{13}$ and n = 0 | 1/1 | 0.874 | 18 | 20/20/44/1 |
| A | TiCl$_4$ | B-3 | — | — | 0.298 | 7 | 40/20/94/1 |

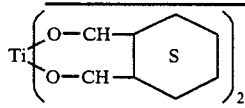

Table II provides the results obtained when a hydroxyl-containing compound represented by selected hydroxyl compounds as the ligand and either TiCl$_4$ or Tipt were used as Ti precursors.

TABLE II

| Example[1] or Comparative Experiment[2] | Ti Compound | Catalyst Preparation Method | Ligand | L/M | Ti Eff. × $10^{-6}$ | Exotherm °C. | Mg/Al/Cl/Ti |
|---|---|---|---|---|---|---|---|
| 7 | TiCl$_4$ | A-1 | Formula XI | 1/1 | 0.892 | 21 | 40/40/84/1 |
| 8 | TiCl$_4$ | A-2 | Formula XI | 1/1 | 0.842 | 17 | 20/20/44/1 |
| 9 | TiCl$_4$ | A-1 | Formula XIII | 1/1 | 0.750 | 18 | 40/40/84/1 |
| 10 | TiCl$_4$ | A-2 | Formula XIII | 1/1 | 0.569 | 11 | 20/20/44/1 |
| 11 | TiCl$_4$ | A-1 | Formula XV wherein $R_a = R_b = H$; $R_c = C_6H_5$; and n = 0 | 1/1 | 0.738 | 16 | 40/40/84/1 |
| B | TiCl$_4$ | B-4 | — | — | 0.298 | 7 | 40/20/94/1 |
| 12 | TiCl$_4$ | A-1 | Formula IX wherein $R_a = R_b = R_c = H$; $R_d = C_6H_5$ and n = 0 | 1/1 | 0.821 | 20 | 40/40/84/1 |
| 13 | TiCl$_4$ | B-3 x = 0 A = 1 | Formula IX wherein $R_a = R_b = R_c = H$; $R_d = C_6H_{13}$ and n = 0 | 1/1 | 1.111 | 20 | 40/10/84/1 |
| 14 | TiCl$_4$ | B-3 x = 0 A = 1.5 | Formula IX wherein $R_a = R_b = R_c = H$; $R_d = C_6H_{13}$ and n = 0 | 1/1 | 0.868 | 14 | 40/15/84/1 |
| 15 | TiCl$_4$ | B-3 x = 0 A = 0.5 | Formula IX wherein $R_a = R_b = R_c = H$; $R_d = C_6H_{13}$ and n = 0 | 1/1 | 0.925 | 15 | 40/5/84/1 |
| 16 | TiCl$_4$ | B-3 x = 0.5 A = 0.5 | Formula IX wherein $R_a = R_b = R_c = H$; $R_d = C_6H_{13}$ and n = 0 | 1/1 | 1.147 | 19 | 40/10/89/1 |
| 17 | TiCl$_4$ | B-3 x = 0.5 A = 1.0 | Formula IX wherein $R_a = R_b = R_c = H$; $R_d = C_6H_{13}$ and n = 0 | 1/1 | 1.051 | 20 | 40/15/89/1 |
| 18 | TiCl$_4$ | B-3 | Formula IX wherein | 1/1 | 1.120 | 19 | 40/15/94/1 |

TABLE II-continued

| Example[1] or Comparative Experiment[2] | Ti Compound | Catalyst Preparation Method | Ligand | L/M | Ti Eff. × $10^{-6}$ | Exotherm °C. | Mg/Al/Cl/Ti |
|---|---|---|---|---|---|---|---|
| 19 | $TiCl_4$ | B-3 $x = 1.0$ $A = 0.5$ | $R_a = R_b = R_c = H; R_d = C_6H_{13}$ and n = 0 Formula XI | 1/1 | 1.073 | 18 | 40/10/84/1 |
| 20 | $TiCl_4$ | B-3 $x = 0$ $A = 1.0$ | Formula XI | 1/1 | 0.976 | 15 | 40/5/84/1 |
| 21 | $TiCl_4$ | B-3 $x = 0$ $A = 0.5$ | Formula XI | 1/1 | 0.938 | 16 | 40/15/84/1 |
| 22 | $TiCl_4$ | B-3 $x = 0$ $A = 1.5$ | Formula XI | 1/1 | 1.232 | 20 | 40/10/89/1 |
| 23 | $TiCl_4$ | B-3 $x = 0.5$ $A = 0.5$ | Formula XI | 1/1 | 1.091 | 20 | 40/15/89/1 |
| 24* | tipt | B-3 $x = 2.5$ $A = 1.5$ | Formula IX wherein $R_a = R_b = R_c = H; R_d = C_6H_{13}$ and n = 0 | 2/1 | 0.639 | 11 | 40/40/105/1 |
| 25* | tipt | B-3 $x = 2.0$ $A = 2.0$ | Formula IX wherein $R_a = R_b = R_c = H; R_d = C_6H_{13}$ and n = 0 | 2/1 | 0.678 | 11 | 40/40/100/1 |
| 26* | tipt | B-3 $x = 2.0$ $A = 1.5$ | Formula IX wherein $R_a = R_b = R_c = H; R_d = C_6H_{13}$ and n = 0 | 2/1 | 0.667 | 13 | 40/35/100/1 |
| 27* | tipt | B-3 $x = 1.5$ $A = 2.0$ | Formula IX wherein $R_a = R_b = R_c = H; R_d = C_6H_{13}$ and n = 0 | 2/1 | 0.613 | 11 | 40/35/95/1 |
| 28* | tipt | B-3 $x = 1.0$ $A = 2.5$ | Formula IX wherein $R_a = R_b = R_c = H; R_d = C_6H_{13}$ and n = 0 | 2/1 | 0.622 | 10 | 40/35/90/1 |
| 29* | tipt | B-3 $x = 0.5$ $A = 2.5$ | Formula IX wherein $R_a = R_b = R_c = H; R_d = C_6H_{13}$ and n = 0 | 2/1 | 0.532 | 8 | 40/30/85/1 |
| 30* | tipt | B-3 $x = 1.0$ $A = 2.0$ | Formula IX wherein $R_a = R_b = R_c = H; R_d = C_6H_{13}$ and n = 0 | 2/1 | 0.600 | 11 | 40/30/90/1 |
| 31* | tipt | B-3 $x = 1.0$ $A = 1.5$ | Formula IX wherein $R_a = R_b = R_c = H; R_d = C_6H_{13}$ and n = 0 | 2/1 | 0.595 | 10 | 40/25/90/1 |
| 32* | tipt | B-3 $x = 1.0$ $A = 1.0$ | Formula IX wherein $R_a = R_b = R_c = H; R_d = C_6H_{13}$ and n = 0 | 2/1 | 0.586 | 10 | 40/20/90/1 |
| C | tipt | B-4 | — | — | 0.530 | 12 | 40/20/90/1 |
| 33* | tipt | B-3 $x = 1.0$ $A = 1.0$ | Formula IX wherein $R_a = R_d = -CH_3; R_b = R_c = H$ and n = 0 | 2/1 | 0.683 | 14 | 40/20/90/1 |
| 34* | tipt | B-3 $x = 1.0$ $A = 1,5$ | Formula IX wherein $R_a = R_d = -CH_3; R_b = R_c = H$ and n = 0 | 2/1 | 0.632 | 13 | 40/25/90/1 |
| 35* | tipt | B-3 $x = 1.5$ $A = 1.0$ | Formula IX wherein $R_a = R_d = -CH_3; R_b = R_c = H$ and n = 0 | 2/1 | 0.737 | 15 | 40/25/95/1 |
| 36* | tipt | B-3 $x = 1.5$ $A = 1.5$ | Formula IX wherein $R_a = R_d = -CH_3; R_b = R_c = H$ and n = 0 | 2/1 | 0.584 | 11 | 40/30/95/1 |
| 37* | tipt | B-3 $x = 2.0$ $A = 1.0$ | Formula IX wherein $R_a = R_d = -CH_3; R_b = R_c = H$ and n = 0 | 2/1 | 0.565 | 12 | 40/30/100/1 |
| 38* | tipt | B-3 $x = 1.5$ $A = 0.5$ | Formula IX wherein $R_a = R_d = -CH_3; R_b = R_c = H$ and n = 0 | 2/1 | 0.585 | 10 | 40/20/95/1 |
| D | tipt | B-4 | — | — | 0.575 | 13 | 40/20/90/1 |

*The titanium complexes in Examples 24-38 were prepared from the indicated compounds, isolated and redissolved or dispersed in Isopar ® E.
[1] The examples of the invention are designated by numerals.
[2] Comparative experiments are designated by letters.

EXAMPLES 39-44

Preparation and Recovery of Titanium Compounds or Complexes

To 50 ml of warm oxygen-free, dry toluene solution containing 0.01 moles of the hydroxyl-containing compound was added slowly, dropwise, 15 ml of oxygen-free, dry toluene containing 0.005 moles of tetraisopropoxy titanium. No color change was observed. Heating, stirring and nitrogen blanket were maintained for 1 hour (3600 s) after which the solution was allowed to come to room temperature. The total volume was then reduced to 5 ml by rotary evaporation after which white precipitates of the complexes or compounds were isolated. They were washed with cold dry oxygen-free toluene and dried overnight at room temperature under vacuum. The components and analytical results are given in Table III.

TABLE III

| Example No. | Hydroxyl-Containing Material(s) | L/M | Theoretical % C | Theoretical % H | Actual % C | Actual % H | The complexes are believed to be represented by the indicated formula |
|---|---|---|---|---|---|---|---|
| 39 | Formula IX wherein $R_a = R_b = R_c = H$; $R_d = C_6H_{13}$ and n = 0 | 2/1 | 57.1 | 9.59 | 56.4 | 9.84 | X wherein n = 0; $R_a = R_b = R_c = H$; and $R_d = C_6H_{13}$ |
| 40 | Formula IX wherein $R_a = R_c = -CH_3$; $R_b = R_d = H$ and n = 0 | 2/1 | 42.9 | 7.20 | 43.2 | 8.13 | X wherein n = 0; $R_a = R_c = -CH_3$; and $R_b = R_d = H$ |
| 41 | Formula IX wherein $R_a = R_b = R_c = H$; $R_d = C_6H_5$ and n = 0 | 2/1 | 58.4 | 5.20 | 58.7 | 4.79 | X* wherein $R_a = R_b = R_c = H$; $R_d = C_6H_5$ and n = 0 |
| 42 | Formula XI | 2/1 | 57.8 | 8.49 | 57.3 | 8.43 | XIII |
| 43 | Formula XIII | 2/1 | 60.0 | 5.04 | 59.8 | 5.08 | XIV |
| 44 | Formula IX wherein $R_a = R_b = R_c = R_d = H$; n = 1; A = $-CH_2-$ | 2/1 | 36.8 | 6.17 | 36.9 | 6.04 | X wherein $R_a = R_b = R_c = R_d = H$; A = $-CH_2-$ and n = 1 |

*isolated as the hemihydrate

We claim:

1. In a process for polymerizing at least one α-olefin or a mixture of at least one α-olefin and at least one polymerizable ethylenically unsaturated monomer in the presence of a supported Ziegler-Natta catalyst; the improvement which comprises employing as the transition metal component of such catalyst that which results from reacting (A) at least one titanium compound represented by the formula $Ti(OR)_xX_{4-x}$ wherein each R is independently a hydrocarbyl group having from 1 to about 20 carbon atoms; X is a halogen and x has a value from zero to 4; with (B) at least one compound containing at least one aliphatic hydroxyl group represented by the formula

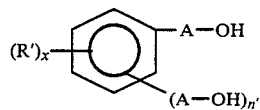

wherein each A is independently a divalent hydrocarbyl group having from 1 to about 10 carbon atoms; R' is independently hydrogen, a halogen atom, a hydrocarbyl group, a hydrocarbyloxy group or a halogen, nitro or hydrocarbyloxy substituted hydrocarbyl group or a halogen, nitro or hydrocarbyloxy substituted hydrocarbyloxy group, each such hydrocarbyl or hydrocarbyloxy groups having from 1 to about 20 carbon atoms; n' has a value of from 1 to 5, and each x independently has a value of from zero to 4; and wherein components (A) and (B) are employed in quantities which provide a molar ratio of (B):(A) of 0.1:1 to about 10:1.

2. A process of claim 1 wherein
(1) in component (A)
  (a) each R independently has from 1 to about 10 carbon atoms; and
  (b) X is chlorine; and
(2) in component (B)
  (a) A has from 1 to about 4 carbon atoms; and
  (b) when R' is a hydrocarbyl group or a hydrocarbyloxy group, it has from about 1 to about 10 carbon atoms; and (3) components (A) and (B) are employed in quantities which provides a molar ratio of B:A of from about 1:1 to about 5:1.

3. A process of claim 2 wherein
(a) in component (A), each R has from about 2 to about 4 carbon atoms, and
(b) components (A) and (B) are employed in quantities which provide a molar ratio of (B):(A) of from about 1:1 to about 2:1.

4. A process of claim 3 wherein in component (B)
(a) n' has a value of 1;
(b) each A is a methylene group; and
(c) each R' is hydrogen; and
(d) x has a value of 4.

5. A process of claims 1, 2, 3 or 4 wherein component A is tetraisopropoxytitanium, tetra-n-butoxy titanium, titanium tetrachloride or a mixture thereof.

6. A process of claims 1, 2, 3 or 4 wherein ethylene or a mixture of ethylene and at least one α-olefin having from 2 to about 10 carbon atoms is polymerized.

7. A process of claim 6 wherein ethylene or a mixture of ehtylene and at least one of butene-1, hexene-1 or octene-1 is polymerized.

8. A process of claim 5 wherein ethylene or a mixture of ethylene and at least one α-olefin having from 2 to about 10 carbon atoms is polymerized.

9. A process of 8 wherein ethylene or a mixture of ethylene and at least one of butene-1, hexene-1 or octene-1 is polymerized.

10. A process for polymerizing at least one α-olefin or a mixture of a least one α-olefin and at least one polymerizable ethylenically unsaturated monomer under suitable polymerization conditions in the presence of a catalyst composition resulting from reacting in an inert hydrocarbon medium (A) at least one hydrocarbon soluble organomagnesium component represented by the formula $MgR''_2.xMR''_y$ wherein each R'' is independently a hydrocarbyl group having from 1 to 20 carbon atoms; M is selected from the group consisting of Al, Zn Si, Sn, B and P; y has a number corresponding to the valence of M and x has a value from about 0.001 to about 10;

(B) a halide source selected from
  (1) an active non-metallic halide, said non-metallic halide corresponding to the formula R'X wherein R' is hydrogen or a hydrocarbyl group having from 1 to about 20 carbon atoms and such that the hydrocarbyl halide is at least as active as sec-butyl chloride and does not poison the catalyst and X is halogen; or (2) a metallic halide corresponding to the formula $MR_{y-a}X_a$ wherein M is a metal of Group IIIA or IVA of Mendeleev's Periodic Table of Elements, R is a monovalent hydrocarbyl group having from 1 to about 20 carbon atoms, X is halogen, y is a number corresponding to the valence of M and a is a number from 1 to y; and (C) a compound or complex resulting from reacting
  (1) at least one titanium compound represented by the formula $Ti(OR)_xX_{4-x}$ wherein each R is independently a hydrocarbyl group having from 1 to about 20 carbon atoms; X is a halogen and x has a value from zero to 4; with
  (2) at least one compound containing at least one aliphatic hydroxyl group represented by the formula

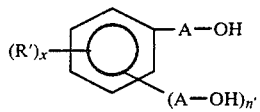

wherein each A is independently a divalent hydrocarbyl group having from 1 to about 10 carbon atoms; R' is independently hydrogen, a halogen atom, a hydrocarbyl group, a hydrocarbyloxy group or a halogen, nitro or hydrocarbyloxy substituted hydrocarbyl group or a halogen, nitro or hydrocarbyloxy substituted hydrocarboxyl group, each such hydrocarbyl or hydrocarbyloxy groups having from 1 to about 20 carbon atoms; n' has a value of from 1 to 5, and each x independently has a value of from zero to 4;

and when components (A) and/or (B) do not contain or contain an insufficient quantity of aluminum, then (D) an aluminum compound represented by the formula $AlR_{y'}X_{y''}$ wherein R is a hydrocarbyl group having from 1 to about 10 carbon atoms; X is halogen and y' and y'' each have a value of from zero to three with the sum of y' and y'' being three is employed;

and wherein the components are employed in quantities so as to provide the following ratios:

(1) a Mg:Ti atomic ratio of from about 1:1 to about 200:1;

(2) components (C-2) and (C-1) are employed in quantities which provide a molar ratio of (C-2):(C-1) of from about 0.1:1 to about 10:1;

(3) excess X:Al ratio of from about 0.0005:1 to about 10:1; and (4) an Al:Ti atomic ratio of from about 0.1:1 to about 2000:1.

11. A process of claim 10 wherein
(1) in component (A),
  (a) R'' has from 1 to about 10 carbon atoms;
  (b) M is aluminum; and
  (c) x has a value from 0.001 to about 5;
(2) in component (B),
  (a) M is aluminum;
  (b) R' is hydrogen or a tertiary butyl group;
  (c) X is chlorine; and
  (d) R and R' independently have from 1 to about 10 carbon atoms;
(3) in component (C-1),
  (a) R has from about 1 to about 10 carbon atoms; and
  (b) X is chlorine;
(4) in component (C-2)
  (a) A has from 1 to about 4 carbon atoms; and
  (b) when R' is a hydrocarbyl group or a hydrocarbyloxy group, it has from about 1 to about 10 carbon atoms;
(5) in component (D),
  (a) M is aluminum;
  (b) R has from 1 to about 10 carbon atoms; and
  (c) X is chlorine; and
(6) the components are employed in quantities so as to provide the following ratios:
  (a) a Mg:Ti atomic ratio of from about 2:1 to about 100:1;
  (b) components (C-1) and (C-2) are employed in quantities which provide a molar ratio of (C-2):(C-1) of from about 1:1 to about 5:1;
  (c) an excess X to Al ratio of from about 0.002:1 to about 2:1; and
  (d) an Al:Ti atomic ratio of from about 0.5:1 to about 200:1.

12. A process of claim 11 wherein
(a) in component (C-1), each R has from about 2 to about 4 carbon atoms.

13. A process of claim 12 wherein the components are employed in quantities so as to provide the following ratios:
(a) a Mg:Ti atomic ratio of from about 5:1 to about 50:1;
(b) in component (C-2)
  (i) n' has a value of 1;
  (ii) each A is a methylene group; and
  (iii) each R' is hydrogen; and
  (iv) x has a value of 4;
(c) components (C-1) and (C-2) are employed in quantities which provide a molar ratio of (C-2):(C-1) of from about 1:1 to about 2:1;
(d) an excess X to Al ratio of from about 0.01:1 to about 1.4:1; and
(e) an Al:Ti atomic ratio of from about 1:1 to about 75:1.

14. A process of claims 10, 11, 12 or 13 wherein the components are added in the order selected from
(A) A, B, ((C-1) and (C-2), prereacted), D (if required);
(B) A, B, D (if required), ((C-1) and (C-2), prereacted);
(C) (A and B, prereacted), ((C-1) and (C-2), prereacted), D (if required);
(D) (A and B, prereacted), D (if required), ((C-1) and (C-2), prereacted); or
(E) (A, B, and D (if required), prereacted), ((C-1) and (C-2), prereacted).

15. A process of claims 10, 11, 12 or 13 wherein component (C-1) is tetraiisopropoxy titanium, tetra-n-butoxy titanium, titanium tetrachloride or a mixture thereof.

16. A process of claim 14 wherein component (C-1) is tetraiisopropoxy titanium, tetra-n-butoxy titanium, titanium tetrachloride or a mixture thereof.

17. A process of claims 10, 11, 12 or 13 wherein ethylene or a mixture of ethylene and at least one α-olefin having from 2 to about 10 carbon atoms is polymerized.

18. A process of claim 17 wherein ethylene or a mixture of ethylene and at least one of butene-1, hexene-1 or octene-1 is polymerized.

19. A process of claim 14 wherein ethylene or a mixture of ethylene and at least one α-olefin having from 2 to about 10 carbon atoms is polymerized.

20. A process of claim 19 wherein ethylene or a mixture of ethylene and at least one of butene-1, hexene-1 or octene-1 is polymerized.

21. A process of claim 15 wherein wherein ethylene or a mixture of ethylene and at least one α-olefin having from 2 to about 10 carbon atoms is polymerized.

22. A process of claim 21 wherein ethylene or a mixture of ethylene and at least one of butene-1, hexene-1 or octene-1 is polymerized.

23. A process of claim 16 wherein ethylene or a mixture of ethylene and at least one α-olefin having from 2 to about 10 carbon atoms is polymerized.

24. A process of claim 23 wherein ethylene or a mixture of ethylene and at least one of butene-1, hexene-1 or octene-1 is polymerized.

* * * * *